Figure 1:
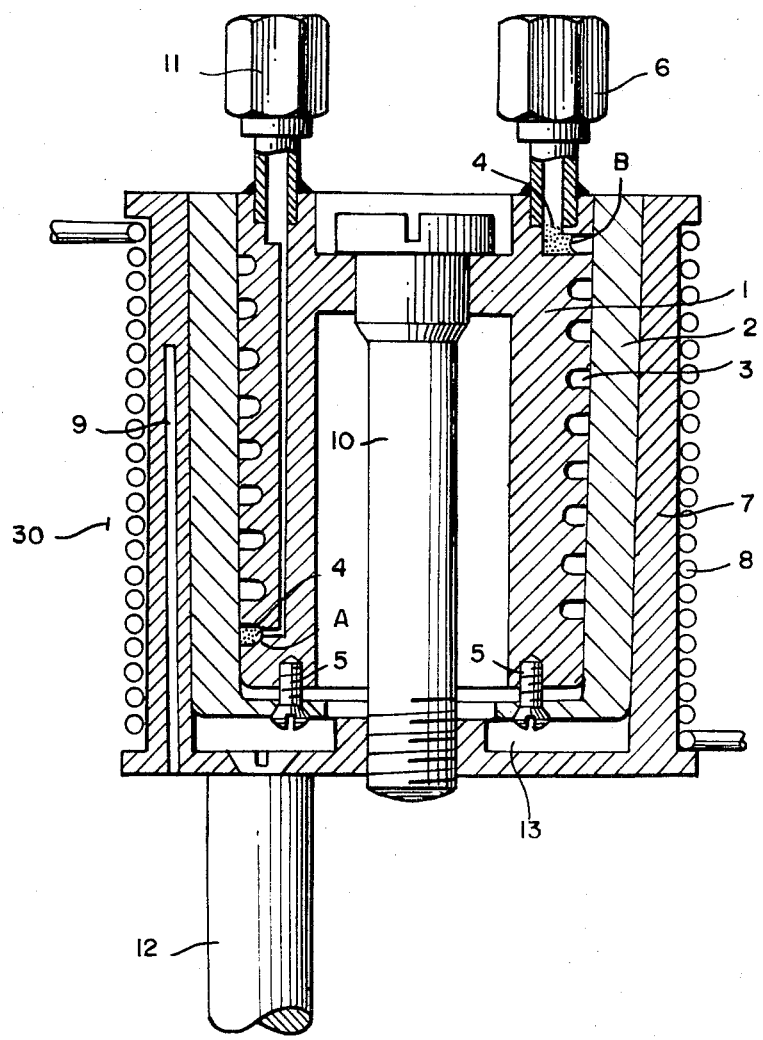

United States Patent [19]
Koehler et al.

[11] 3,841,155
[45] Oct. 15, 1974

[54] REACTION VESSEL FOR ISOTHERMAL CALORIMETRY

[75] Inventors: Waldemar Koehler; Oswald Riedel; Herbert Scherer, all of Ludwigshafen; Georg Schlereth, Limburgerhof, all of Germany

[73] Assignee: Badische Anilin- & Soda-Fabrik Aktiengesellschaft, Ludwigshafen, Germany

[22] Filed: Nov. 24, 1972

[21] Appl. No.: 308,998

[30] Foreign Application Priority Data
Nov. 25, 1971 Germany.......................... 7144398

[52] U.S. Cl. ............................. 73/190 R, 23/253 R
[51] Int. Cl. ...................... G01k 17/00, G01n 25/22
[58] Field of Search............ 23/253 R, 254 R; 73/15, 73/23.1, 190

[56] References Cited
UNITED STATES PATENTS

| | | | |
|---|---|---|---|
| 3,149,941 | 9/1964 | Barnitz et al. .................. | 73/23.1 X |
| 3,318,667 | 5/1967 | Fabuss et al. .................... | 73/15.4 X |
| 3,467,501 | 9/1969 | Groszett............................ | 73/190 X |
| 3,598,534 | 8/1971 | Templer............................ | 73/190 X |

Primary Examiner—Herbert Goldstein
Attorney, Agent, or Firm—Johnston, Root, O'Keeffe, Keil, Thompson & Shurtleff

[57] ABSTRACT

A reaction vessel for isothermal calorimetry, in which the container for the sample consists of two snugly fitting hollow cylindrical bodies, between which there are one or more recesses for the accommodation of the sample.

5 Claims, 2 Drawing Figures

REACTION VESSEL FOR ISOTHERMAL CALORIMETRY

This invention relates to a reaction vessel for isothermal calorimetry, which is approximately cup-shaped and is provided with a heating spiral surrounding the interior of the cup, a container for the sample being located in the interior of the cup near a temperature sensor and inlet and outlet connections for a gas being provided in such a manner that the gas passes through the sample.

This invention makes isothermal calorimetry available for a certain field of operation hitherto reserved mainly for differential thermoanalysis apparatus (DTA apparatus), namely the field of reactions between gases and solids, e.g., catalyst samples.

The principle of isothermal calorimetry consists in balancing out the temperature change occurring in the sample due to chemical or physical change, such balancing being effected by applying electrical energy to a suitable installed heating coil in such an accurate manner that the necessary compensating heating power forms a precise measure of the change in enthalpy associated with the change in state being measured. Since the reaction vessel is connected to a thermostatically controlled reservoir via a suitably dimensioned resistance to heat flow, the compensating heating power is adjusted so as to maintain a constant temperature differential between the reaction vessel and the reservoir.

This compensating power is recorded as a function of time so that the kinetics of the reaction may be directly measured and also the change in enthalpy as a result of the reaction may be exactly measured quantitatively as an area integral under the recorded curve. The process variable, i.e., the compensating power, may be calibrated exactly using electrical standards.

Since gas flows quantitatively through the sample in the apparatus of the invention, it is advantageous to cause the gas stream to flow through analyzers, e.g., gas chromatographs, before entering and/or after leaving the said apparatus.

Prior art reaction vessels used for the DTA process are useless for our proposed method of measurement by isothermal calorimetry, since the DTA equipment is characterized in that a small bowl-shaped vessel for the sample is located in a large surrounding gas chamber wall-heated by a heating coil. Thus the heating efficiency between the heating coil and the sample is insufficient for the application of compensating heating power as required in isothermal calorimetry. Moreover, the gas is merely located over the sample and does not flow through it quantitatively.

In the DTA process, the process variable is the temperature differential between sample and wall, which gives comparatively unreliable interpretations, and the necessity for a reference substance forms a further source of error and uncertainty. Such a reference substance is located in a similar bowl having the same kind of temperature sensor as the sample has, and the reference substance must have the property of being absolutely inert to temperature changes, a characteristic highly difficult to demonstrate. The DTA method is by no means an isothermal method, since the wall of the gas chamber is increasingly heated at an optionally determined rate. Unlike that system, isothermal calorimetry requires no reference substance.

It is an object of the present invention to provide a reaction vessel of the kind mentioned above such that the container for the sample is suitable for isothermal calorimetry, is simple to manipulate and may be used an unlimited number of times.

In accordance with the present invention, the above object is achieved in that the container consists of two snugly fitting substantially cylindrical hollow bodies, between which there are one or more recesses for the accommodation of the sample. In an advantageous embodiment of the invention, one of the said substantially cylindrical hollow bodies has a recess on its outer (or inner, as the case may be,) wall surface, which recess is in the form of a spiral groove. This means that only one of the cylindrical hollow bodies need be machined to provide the said recess, whilst the mating surface of the other body is machined smooth. The use of a spiral recess has the advantage that the sample container may be inserted as a compact unit in a gas circulation.

According to another feature of the invention, the bodies are hollow and tapered. This simplifies the production of a snug fit between said bodies.

According to yet another feature of the invention, the hollow tapered bodies are adapted to fit in a correspondingly tapered heating unit. In this way, the sample container may be removed from the heating unit, this having the advantage that the sensitive heating coil need not be subjected to the vibrations required to consolidate the granular or powdered sample. The tapered snug fit between the sample container and the heating unit also ensures good heat transfer. Finally, the hollow bodies are preferably of stainless steel.

Figure 2:
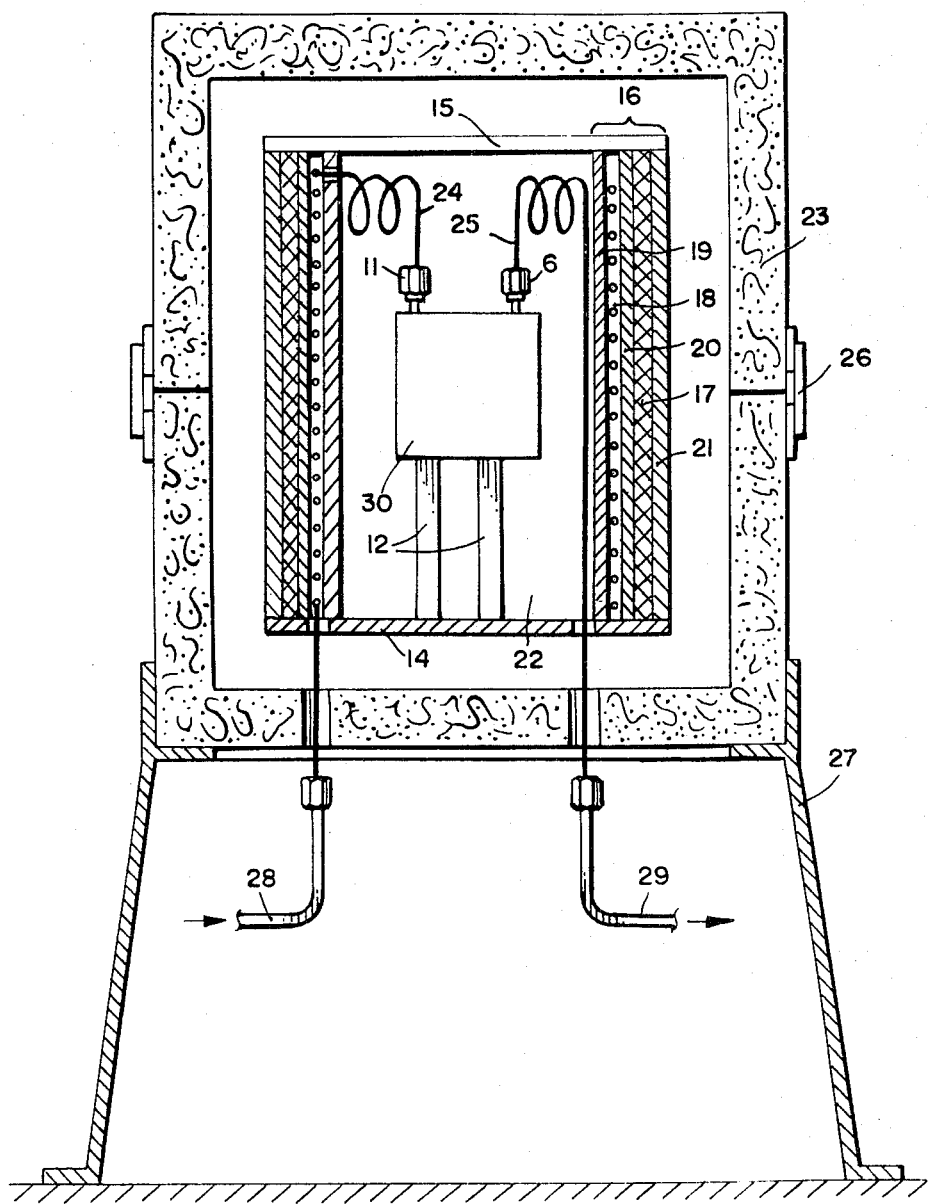

An embodiment of the invention is described below with reference to the accompanying drawings, in which FIG. 1 illustrates a reaction vessel, partly in section, and FIG. 2 shows the arrangement of the reaction vessel of FIG. 1 in a thermostatically controlled chamber surrounded by an insulating housing.

All parts of the reaction vessel 30 are of stainless steel. The bodies 1 and 2 are machine-tapered so as to fit snugly together. When the body 1 is removed, the machined groove 3 is easily accessible for emptying and cleaning. One of the stoppers 4 of stainless steel gauze, as required for delimiting the sample chamber, may then be readily inserted at the equally accessible point A. Body 1 is inserted into body 2 and then firmly pulled down into it by tightening screws 5. The block is mounted on a vibrating table and filled with a weighed amount of the powdered or granulated material through a funnel inserted in the union 6, until the material reaches point B. The second stopper 4 of stainless steel gauze is then inserted at point B through the union 6. The body 2 is also machine-tapered so as to fit snugly in the heating unit 7, on the outer surface of which there is wound a bifilar heating coil 8 and into the body of which four thermistors 9 are inserted at regular intervals around the periphery to act as temperature sensors for the control circuit. The snug fit between the block containing the sample and comprising bodies 1 and 2, and the heating unit is achieved by tightening a screw 10. A tolerance space 13 is provided to ensure that the screw 10 can always be tightened sufficiently. Unions 6 and 11 serve for the passage of the gas stream, for which reason stainless steel capillary tubes can be screw-connected to unions 6 and 11 to form a gas-tight seal therewith. The above-described arrangement of the gas route makes it impossible for the gas to by-pass the sample. The entire reaction vessel 30 consisting of parts 1 to 11 is mounted on three supports 12 of insulating and thermally resistant material.

FIG. 2 shows the set-up of the complete calorimeter. The reaction vessel 30 is screwed to a base-plate 14 by way of the three supports 12. The base-plate 14 and similar cover plate 15 enclose a hollow cylindrical block 16 in which a heating coil 17 and a hollow cylinder 18 are held in thermal contact by means of three metal cylinders 19 to 21. Temperature sensors (not shown) are inserted into the innermost of said metal cylinders, i.e., cylinder 19, and these temperature sensors form, together with the heating coil 17 and conventional circuit units, a control circuit for the outer, thermostatically controlled reservoir formed by the metallic masses of the cylinders 19 to 21 and the cover plates 14 and 15. The thermal resistance is provided by an air gap 22. A capillary tube 24 of refined steel passes through the hollow cylinder 18 of said outer reservoir, taking a long path consisting of a large number of turns to ensure that the gas stream reaches the reaction vessel at the exact temperature of the reservoir. A similar capillary tube 25 leads the gas stream away from the reaction vessel, e.g., to a gas chromatograph. The insulating housing 23 is packed with aluminum silicate wool and is composed of two halves held together by catches 26, the lower half possessing bores for the capillaries 24 and 25, which are sealingly screw-connected to gas pipes 28 and 29. The entire assembly rests on a frustum-shaped base 27 of metal sheeting.

Due to the fact that the stream of carrier gas through the reaction vessel can be identical to the carrier gas stream in analyzers, connected upstream or downstream of our calorimeter, it is possible to establish highly useful arrangements not only for qualitative but also for quantitative analysis, e.g., for examining the activity of catalysts.

The reaction vessel is characterized by a relatively simple and particularly convenient construction.

We claim:

1. A reaction vessel for isothermal calorimetry embodying a hollow, heat-conducting, substantially cylindrical, heating cup-shaped vessel having a heating coil about said heating vessel, a container snugly and removably fitted in said heating vessel, and temperature sensor means positioned in said vessel adjacent said container, the improvement which comprises two concentric, hollow, substantially cylindrical bodies snugly fitted together to form said container with the outer wall of the inner hollow body lying snugly against the inner wall of the outer hollow body, the outer wall of said outer body lying snugly against the inner wall of said vessel, a spiral groove in at least one of said walls forming a spiral passage between walls, passage means in one of said bodies for supplying a gas to one end of said spiral groove, additional passage means in one of said bodies for withdrawing gas from the other end of said spiral groove, and a sample of powdered or granulated solids in said spiral groove, whereby said spiral groove may be filled with a weighed amount of said powdered or granulated sample by vibrating said container apart from said heating vessel, gas may be passed through the sample-filled spiral groove after mounting of said container in said heating vessel for isothermal calorimetric studies and said sample may be cleansed from said spiral groove by removal of said container and disassembly of said hollow bodies to expose said spiral groove.

2. A reaction vessel as claimed in claim 1 wherein said hollow bodies are tapered hollow bodies.

3. A reaction vessel as claimed in claim 2, said vessel having a tapered cylindrical wall lying snugly against the tapered outer wall of said outer hollow body.

4. A reaction vessel as claimed in claim 2, said hollow bodies being stainless steel bodies.

5. A calorimeter comprising an insulated housing, a closed, thermostatically controlled chamber in said housing, a wall of said chamber being three concentric metal cylinders, a heating coil between the two outermost metal cylinders, a spiral gas supply tube between the two innermost metal cylinders; a reaction vessel mounted in said chamber, said vessel comprising a hollow, heat-conducting, substantially cylindrical vessel suspended in said chamber, a heating coil about said vessel, and a container snugly and removably fitted within said vessel; said container being two concentric, hollow, substantially cylindrical bodies snugly fitted together to form said container with the outer wall of the inner hollow body lying snugly against the inner wall of the outer hollow body lying snugly against the inner wall of the outer hollow body, a spiral groove in at least one of said walls forming a spiral passage between said walls; a tube connecting said gas supply tube and passage means in one of said bodies for supplying a gas to one end of said spiral groove; and a second gas exit tube connecting additional passage means in one of said bodies communicating with the other end of said spiral groove, said second tube projecting through said chamber and said insulated housing, whereby supply gas passing through said heating coil to said vessel reaches the temperature of said chamber prior to entry of the gas into said reaction vessel.

* * * * *